US012448205B2

(12) United States Patent
Parenzee et al.

(10) Patent No.: US 12,448,205 B2
(45) Date of Patent: Oct. 21, 2025

(54) FLEXIBLE TANK WITH A MIXING MEMBER

(71) Applicant: TRANS OCEAN BULK LOGISTICS LIMITED, Southampton (GB)

(72) Inventors: Sergio Parenzee, Southampton (GB); Andrew Lang, Southampton (GB)

(73) Assignee: TRANS OCEAN BULK LOGISTICS LIMITED, Southampton (GB)

(*) Notice: Subject to any disclaimer, the term of this patent is extended or adjusted under 35 U.S.C. 154(b) by 881 days.

(21) Appl. No.: 17/273,135

(22) PCT Filed: Aug. 8, 2019

(86) PCT No.: PCT/GB2019/052232
§ 371 (c)(1),
(2) Date: Mar. 3, 2021

(87) PCT Pub. No.: WO2020/049268
PCT Pub. Date: Mar. 12, 2020

(65) Prior Publication Data
US 2021/0323759 A1    Oct. 21, 2021

(30) Foreign Application Priority Data
Sep. 6, 2018   (GB) .................................... 1814528

(51) Int. Cl.
B65D 88/22        (2006.01)
B01F 33/40        (2022.01)
(Continued)

(52) U.S. Cl.
CPC ............ B65D 88/22 (2013.01); B01F 33/406 (2022.01); B01F 33/409 (2022.01);
(Continued)

(58) Field of Classification Search
CPC .... B01F 33/406; B01F 35/513; B01F 23/023; B65D 88/745; B65D 88/22
See application file for complete search history.

(56) References Cited

U.S. PATENT DOCUMENTS

2005/0167448 A1   8/2005 Schall et al.
2005/0167488 A1   8/2005 Higgins et al.
(Continued)

FOREIGN PATENT DOCUMENTS

GB    2433216 A     6/2007
WO    2006041541 A1  4/2006
WO    2006093572 A2  9/2006

OTHER PUBLICATIONS

Search Report from counterpart Great Britian Application No. 1814528.4, dated May 6, 2021, 4 pp.
(Continued)

Primary Examiner — Anshu Bhatia
(74) Attorney, Agent, or Firm — Shumaker & Sieffert, P.A.

(57) ABSTRACT

A flexible tank (10, 110) for transporting fluids in a transportation container (12) is described, the flexible tank (10, 110) defining a tank (10) volume for containing a fluid. The flexible tank (10, 110) comprises at least one mixing member (146, 46) enclosing a fluid pathway (160, 60) extending across an interior surface (144, 44) of the flexible tank (10, 110), the flexible tank (10, 110) further comprising at least one inlet valve (140, 40) configured to allow the passage of fluid from outside said flexible tank (10, 110) into said fluid pathway (160, 60). The mixing member (146, 46) further comprises at least one aperture (154) such that the inlet valve (140, 40) is in fluid communication with the tank (10) volume via the fluid pathway (160, 60). An intermodal container (12) comprising the flexible tank (10, 110) and a method of mixing a fluid with the tank (10) are also disclosed.

19 Claims, 4 Drawing Sheets

(51) Int. Cl.
*B01F 35/513* (2022.01)
*B65D 88/74* (2006.01)
*B65D 90/04* (2006.01)
*B01F 23/00* (2022.01)

(52) U.S. Cl.
CPC .......... *B01F 35/513* (2022.01); *B65D 88/745* (2013.01); *B65D 90/046* (2013.01); *B01F 23/023* (2022.01)

(56) References Cited

U.S. PATENT DOCUMENTS

| | | | |
|---|---|---|---|
| 2006/0270036 A1* | 11/2006 | Goodwin | B01F 27/113 |
| | | | 435/395 |
| 2011/0207218 A1 | 8/2011 | Staheli et al. | |
| 2011/0287404 A1 | 11/2011 | Niazi | |
| 2013/0082410 A1* | 4/2013 | Goodwin | C12M 29/06 |
| | | | 261/42 |
| 2015/0265958 A1 | 9/2015 | Brown et al. | |
| 2015/0290597 A1 | 10/2015 | Niazi | |
| 2016/0298071 A1* | 10/2016 | Brau | C12M 23/14 |
| 2017/0349874 A1* | 12/2017 | Jaques | B01F 27/191 |

OTHER PUBLICATIONS

International Preliminary Report on Patentability from International Application No. PCT/GB2019/052232, mailed Mar. 9, 2021, 7 pp.
International Search Report and Written Opinion dated Nov. 18, 2019 from counterpart International Application No. PCT/GB2019/052232, 14 pp.

* cited by examiner

FLEXIBLE TANK WITH A MIXING MEMBER

This application is a national stage application under 35 U.S.C. § 371 of PCT Application No. PCT/GB2019/052232, filed Aug. 8, 2019, which claims the benefit of Great Britain Application No. 1814528.4, filed Sep. 6, 2018. The entire contents of each of PCT Application No. PCT/GB2019/052232 and Great Britain Application No. 1814528.4 are incorporated herein by reference in their entireties.

FIELD OF THE INVENTION

The present invention relates to a flexible tank for transporting fluids, and more particularly to a flexible tank comprising a mixing member.

BACKGROUND TO THE INVENTION

Using tanks to transport fluids is well known. Increasingly, tanks with flexible components located inside transportation containers, which are commonly known as flexitanks or flexible tanks, have been employed for this purpose. Tanks of this nature change in volume and shape with the volume of their fluid contents. A wide range of transportation containers can be used to contain these types of tanks including, but not limited to, intermodal, International Organisation for Standardization (ISO), cargo, freight, rail or shipping containers.

Flexible tanks can be used to transport a wide range of fluids. Some fluids can settle and separate during transport or storage, such as high specific gravity fluids. This settling and separation can result in the formation of a denser layer at the bottom of the flexible tank, and a less dense layer at the top of the flexible tank. The dense layer may be a sludge, precipitate from the fluid or particulate-rich layer, whereas the less dense layer, may be predominantly water or another low-density fluid.

It is often preferable to thoroughly mix fluids before discharging them from a flexible tank. Mixing a fluid which has separated before discharge helps ensure that all of the fluid, including any sludge or particulate matter, is removed from the flexible tank and that the fluid discharged is homogenous. This discharge of a homogenous fluid is often desirable.

Current methods of mixing fluids within a flexible tank include agitating the fluids using bubbles. One system using this approach is the Pulsair® mixing tank, which generates large air bubbles to agitate and mix a fluid. However, mixing systems of this type present many challenges in their current form.

Firstly, current methods can be prohibitively expensive. Additionally, systems, as described above, are not incorporated directly into the flexible tank. Therefore, at the location where the tank is to be discharged, it is necessary to open ports on the top surface of the flexible tank and insert the mixing apparatus. The insertion of the mixing apparatus often results in the fluid being spilt or lost to the environment. This process is undesirable as it exposes the contents of the flexible tank, which may result in contamination or spoilage of the fluid contents of the tank.

Inserting the mixing apparatus can be logistically challenging and drastically increase the amount of time taken to discharge a tank. For example, there is usually only a small amount of headspace available above the flexible tank in a transportation container and getting the mixing equipment up and over the flexible tank, and then into the flexible tank can be challenging.

Disadvantageously, some mixing apparatuses solely require pressurised air or an air compressor to be supplied at the point of discharge, both of which increase costs. The costs of these systems are further increased as the pressurised air, in certain cases, will need to be sterilised to avoid contaminating the fluid being discharged from the flexible tank. An additional complication is that when using pressurised air the piping or tubing inserted into the tank must be rigid and solid. The insertion of rigid and solid elements into a flexible tank further increases the risk of damage and leaks.

Objects and aspects of the present claimed invention seek to alleviate at least these problems of the prior art.

SUMMARY OF THE INVENTION

In accordance with the present claimed invention, there is provided a flexible tank for transporting fluids in a transportation container, the flexible tank defining a tank volume for containing a fluid, the flexible tank comprising at least one mixing member enclosing a fluid pathway extending across an interior surface of the flexible tank, the flexible tank further comprising at least one inlet valve configured to allow the passage of fluid from outside said flexible tank into the fluid pathway, wherein the at least one mixing member further comprises at least one aperture such that the inlet valve is in fluid communication with the tank volume via the fluid pathway.

In use, the present claimed flexible tank allows a mixing fluid to be pumped into the flexible tank via the inlet valve and the fluid pathway. The fluid pathway extends through the interior of the mixing members. The mixing fluid enters the flexible tank via the inlet valve and is then pushed along and through the fluid pathway enclosed by the mixing member. The mixing fluid can then enter the tank volume via the at least one aperture. The movement of the mixing fluid from the fluid pathway and into the tank volume creates currents inside of the tank volume, these currents agitate and mix the contents of the flexible tank. As such, the present claimed invention has the advantage of providing a method of mixing and agitating the fluid contents of the flexible tank without inserting additional equipment into the flexible tank.

The mixing fluid may be either a liquid or a gas. The mixing fluid may also comprise both one or more gases and one or more liquids in combination. Preferably, where the mixing fluid is a gas, this gas is air. More preferably, where the mixing fluid is air, the air is provided from a compressed air cylinder.

Preferably, the at least one mixing member extends across at least 50% of an interior surface of the flexible tank. More preferably, the at least one mixing member extends across at least 75% an interior surface of the flexible tank. More preferably, the at least one mixing member extends across at least 80% an interior surface of the flexible tank. Even more preferably, the at least one mixing member extends across at least 90% an interior surface of the flexible tank. Still further preferably, the at least one mixing member extends completely across an interior surface of the flexible tank.

Preferably, the at least one mixing member is attached to an interior surface of the flexible tank. More preferably, the at least one mixing member is attached to an interior surface of the flexible tank in at least two places. Still more preferably, the mixing member is attached along at least 50% of its entire length to the interior surface of the flexible tank. Still more preferably, the mixing member is attached along at least 75% of its entire length to the interior surface of the flexible tank. Most preferably, the mixing member is attached along substantially its entire length to the interior surface of the flexible tank. Preferably, the attachment is formed by a weld. Preferably, the weld is an extrusion weld.

Preferably, the mixing member extends across an interior surface which, in use, is a lower surface of the flexible tank. More preferably, the mixing member extends across an interior surface which, in use, is the lowest surface of the flexible tank. Most preferably, the mixing member extends across an interior surface of the flexible tank which, in use, is the bottom of the flexible tank. Preferably, the mixing member extends linearly in the volume of the tank.

Preferably, the longitudinal axis of the at least one mixing member is substantially parallel to the longitudinal axis of the flexible tank. More preferably, the longitudinal axis of each of the mixing members is substantially parallel to the longitudinal axis of said flexible tank. Preferably, the mixing member extends in a direction substantially perpendicular to the plane of the front surface of the flexible tank. Preferably, the mixing member extends in a plane substantially parallel to the plane of the lower surface of the flexible tank.

Preferably, at least a portion of the mixing member extends at an angle to the longitudinal axis of the flexible tank. More preferably, the entire mixing member extends at an angle to the longitudinal axis of the flexible tank. Preferably, at least a portion of the mixing member extends parallel to the longitudinal axis of the flexible tank. More preferably the entire mixing member extends parallel to the longitudinal axis of the flexible tank. Still more preferably, the mixing member comprises a portion which extends parallel to the longitudinal axis of the flexible tank and a portion which extends at an angle to the longitudinal axis of the flexible tank. Most preferably, the portion which extends parallel to the longitudinal axis of the flexible tank and the portion which extends at an angle to the longitudinal axis of the flexible tank are connected by a bend. Preferably, both the portion which extends parallel to the longitudinal axis of the flexible tank and the portion which extends at an angle to the longitudinal axis of the flexible tank are linear.

Preferably, the mixing member extends across the largest interior surface of the flexible tank.

Preferably, the flexible tank further comprises at least one outlet valve configured to allow the passage of fluid out of the tank volume. Preferably, in use, the outlet valve is located in an upper surface of the flexible tank. Preferably, in use, the outlet valve is located closer to a front surface of the flexible tank than a rear surface of the flexible tank. Preferably, the outlet valve is a one-way valve configured to allow the passage of fluid out of the tank. Preferably, the one-way valve comprises a check valve, clack valve, non-return valve, reflux valve or a retention valve.

Preferably, the cross-sectional area of the at least one aperture of the mixing member is smaller than the cross-sectional area of the fluid pathway. More preferably, the cross-sectional area of the at least one aperture of the mixing member is at least 10% smaller than the cross-sectional area of the fluid pathway. Most preferably, the cross-sectional area of the at least one aperture of the mixing member is at least 25% smaller than the cross-sectional area of the fluid pathway.

Preferably, the fluid pathway is substantially tubular. Preferably, the mixing member is substantially tubular and substantially resembles a pipe. Most preferably, the cross section of the fluid pathway is substantially circular.

Preferably, at least one of the mixing members tapers along its longitudinal axis. More preferably, each of the mixing members tapers along its longitudinal axis.

Preferably, the cross-sectional area of the at least one mixing member reduces along its longitudinal axis. More preferably, the cross-sectional area of each of the mixing members reduces along its longitudinal axis.

Preferably, the cross-sectional area of the at least one mixing member reduces along the longitudinal axis of the flexible tank. More preferably, the cross-sectional area of each of the mixing members reduces along the longitudinal axis of the flexible tank.

Preferably, the cross-sectional area of the fluid pathway reduces along its longitudinal axis. Preferably, the cross-sectional area of the fluid pathway reduces along the longitudinal axis of the flexible tank.

Preferably, the cross-sectional area of the at least one mixing member reduces linearly along its longitudinal axis. More preferably, the cross-sectional area of each of the mixing members reduces linearly along its longitudinal axis.

Preferably, the at least one mixing member is substantially conically shaped. More preferably, each of the mixing members is substantially conically shaped.

Preferably, the at least one mixing member is frustoconically shaped. More preferably, each of the mixing members is substantially frustoconically shaped.

Preferably, the largest diameter of the mixing member is less than one-tenth of the length of the mixing member. Preferably, the largest diameter of the mixing member is at least four times larger than the smallest diameter of the cross section.

Preferably, the mixing member has its largest cross-sectional area proximate to the inlet valve. Preferably, the mixing member has its smallest cross sectional at the end of the mixing member opposing the inlet valve.

Preferably, the mixing member comprises a plurality of apertures. Preferably, the apertures of the plurality of apertures are circular.

Preferably, the aperture of the plurality of apertures proximate the inlet valve is the smallest aperture of the plurality of apertures. Preferably, the aperture of the plurality of aperture furthest removed from the inlet valve is the largest aperture of the plurality of apertures. Preferably, the middle apertures, which are the apertures of the plurality of apertures that are not the aperture proximate the inlet valve or the aperture furthest removed from the inlet valve, are similarly sized to one another. Preferably, the middle apertures are at least 1.5 times larger than the aperture proximate the inlet valve. More preferably, the middle apertures are at least 2 times larger than the aperture proximate the inlet valve. Preferably, the middle apertures are less than half the size of the aperture furthest removed from the inlet valve. More preferably, the middle apertures are less than a quarter the size of the aperture furthest removed from the inlet valve.

Preferably, at least a portion of the plurality of apertures forms a spiral pattern around the perimeter of the mixing member. Preferably, the apertures of the plurality of apertures which form the spiral pattern are substantially evenly distributed along the mixing member. Preferably, the entire plurality of apertures forms a spiral pattern around the perimeter of the mixing member.

Preferably, the spiral pattern formed by the apertures extends along at least 15% of the length of the mixing member. More preferably, the spiral pattern formed by the apertures extends along at least 30% of the length of the mixing member. Most preferably, the spiral pattern formed by the apertures extends along substantially the entire length of the mixing member.

More preferably, the plurality of apertures comprises a first subset of apertures which form a spiral pattern around the perimeter of the mixing member and a second subset of apertures which are arranged linearly, in a grid or randomly around or along the perimeter of the mixing member. More preferably, the first subset of apertures is located closer to the inlet valve than the second subset of apertures.

Preferably, at least a portion of the plurality of apertures is located on the surface of the mixing member which is distal from the interior surface of the flexible tank which the mixing member extends across. More preferably, the portion of the plurality of apertures located on the surface of the mixing member which is distal from the interior surface of the flexible tank which the mixing member extends across are substantially evenly distributed along the mixing member. Preferably, the portion of the plurality of apertures located on the surface of the mixing member which is distal from the interior surface of the flexible tank which the mixing member extends across extend along at least 30% of the length of the mixing member, more preferably at least 60% of the length of the mixing member and further preferably still the entire mixing member.

Preferably, a portion of the plurality of apertures is arranged to face the upper surface of the flexible tank. Preferably, the upper surface facing portion of the plurality of apertures are substantially evenly distributed along the mixing member. Preferably, the upper surface facing portion of the plurality of apertures extends along at least 30% of the length of the mixing member. More preferably, the upper surface facing portion of the plurality of apertures extends along at least 60% of the length of the mixing member.

Preferably, the plurality of apertures comprises one or more portions of aligned apertures. Preferably, one or more of the aligned portions of the plurality of apertures are substantially evenly distributed along the mixing member. Preferably, one or more of the portions of aligned apertures extends along at least 20% of the length of the mixing member. More preferably, one or more of the portions of aligned apertures extends along at least 40% of the length of the mixing member. Most preferably, one or more of the portions of aligned apertures extend along at least 60% of the length of the mixing member.

Preferably, the plurality of apertures comprises a first subset of apertures and a second subset of apertures, wherein the first subset of apertures has a smaller cross sectional area than the second subset of apertures. Preferably the first subset of apertures is closer to the inlet valve than the second subset of apertures. Preferably, each of the apertures in the first subset of apertures has substantially the same cross sectional area. Preferably, each of the apertures in the second subset of apertures has substantially the same cross sectional area.

Preferably, the apertures comprising the plurality of apertures are substantially evenly distributed along the length of the mixing member.

Preferably, the plurality of apertures is configured to allow fluid to egress from the fluid pathway through each of the apertures of the plurality of apertures into the tank volume simultaneously Preferably, the flexible tank comprises a plurality of mixing members. Preferably, the flexible tank comprises two mixing members. More preferably, the two mixing members are mirror-images of one another.

Preferably, the flexible tank comprises a plurality of inlet valves, where each one of the inlet valves is connected to a different mixing member within the plurality of mixing members.

Preferably, the flexible tank is configured to be housed within an intermodal container. Preferably, the flexible tank is dimensioned to fit within an intermodal transportation container when filled with fluid. Preferably, the flexible tank fits inside a standard ISO shipping container. Preferably, the flexible tank is dimensioned to fit a standard ISO shipping container that is 6.06 m or 12.2 m (20 foot or 40 foot, respectively) in length. Preferably, the flexible tank is dimensioned to fit inside a 6.06 m or 12.2 m long ISO shipping container when the tank volume is full. Preferably, the flexible tank is dimensioned to fit a 6.06 m or 12.2 m ISO shipping container such that it does not touch either or both of the front doors and the back wall of the 6.06 m or 12.2 m ISO shipping container when fully loaded. Preferably, the flexible tank comprises straps for securing it inside of the transportation container.

Preferably, the inlet valves are configured to be attached to be external pumping means.

Preferably, the flexible tank is substantially cuboid. Preferably, the flexible tank comprises chamfered edges. Preferably, the vertical edges have the largest chamfer.

Preferably, the mixing member and the flexible tank comprise substantially the same material. Preferably, the mixing members comprise flexible components. Preferably, the mixing members are substantially flexible. Preferably, the mixing members substantially comprise flexible polymers.

Preferably the flexible tank comprises an inner liner. Preferably, the inner liner is single-ply. Preferably, the inner liner is multi-ply. Preferably, the inner liner is fabricated from a flexible polymer. Preferably, the inner liner is fabricated from multiple separate sheets of polymer. Preferably, the separate polymer sheets are joined together by fluid-tight seams. Preferably, the inner liner is impermeable to fluid within the tank volume. Preferably, the inner liner is fabricated from polyethylene (polyethene). Preferably, the tank is single layered. Preferably, the single layer is the inner liner. More preferably, the tank is double layered.

Preferably, the flexible tank comprises a protective outer liner. Preferably, the outer liner completely envelopes the inner liner and protects it from being in contact with the inside of the transportation container or wider environment. Preferably, the outer liner has a larger internal volume than the inner liner. Preferably, the shape of the outer liner is complementary to the inner liner. Preferably, the outer layer is fabricated from woven polypropylene WPP.

According to a second aspect of the present invention, there is provided an intermodal container comprising a flexible tank as previously described.

According to a third aspect of the present claimed invention, there is provided a method of mixing the fluid contents of a flexible tank, the method comprising the steps of: providing a flexible tank as described above, the flexible tank containing at least one fluid within the tank volume; providing a mixing fluid; pumping the mixing fluid into the at least one mixing member via the at least one inlet valve such that the mixing fluid flows though the fluid pathway and through the at least one aperture into the tank volume to mix the at least one fluid within the tank volume.

The method may comprise the additional step of removing the mixing fluid via an outlet valve.

Preferably, the mixing fluid is air. Preferably, the mixing fluid is water. Preferably, the mixing fluid is an oil.

Preferably, the mixing fluid is the fluid contained by the flexible tank. In this case, the above method comprises the step of pumping the mixing fluid out of the tank volume

DETAILED DESCRIPTION

Embodiments of the present invention will now be described by way of example only and with reference to the accompanying drawings, in which.

Figure 1:
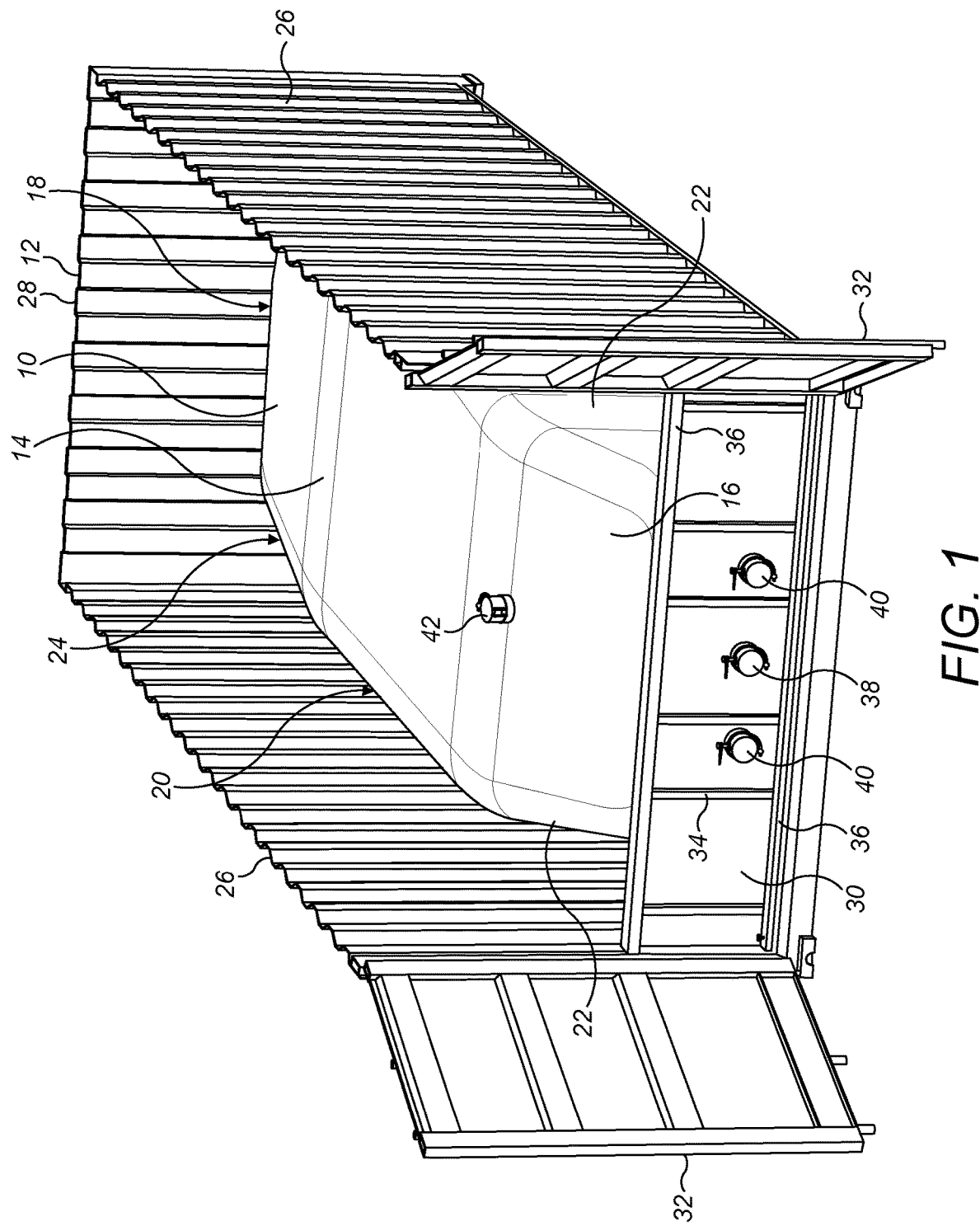
FIG. 1 shows an isometric view of a first example embodiment of a flexible tank, in use, in accordance with the present claimed invention.

Referring to FIG. 1, an isometric view of a flexible tank 10 positioned and housed within an intermodal transportation container 12 is depicted in accordance with a first embodiment of the present claimed invention. The flexible tank 10 is depicted in use and containing a fluid. The flexible tank 10 is substantially cuboid with and comprises six principle faces: an upper face 14, a lower face (not shown), a front face 16, a rear face 18 and two side faces 20. The flexible tank further comprises additional front and rear chamfer faces 22, 24. The front chamfer faces 22 are located between the front face 16 and the side faces 20, whilst the rear chamfer faces 24 are located between the rear face 18 and the side faces 20. The orientation of the chamfer is arranged such that the internal angles between the side faces 20 and the front and rear chamfered faces 22, 24 is larger than the internal angles between the front and rear faces 16, 18 and the front and rear chamfered faces 22, 24.

In use, the flexible tank 10 occupies approximately 50% of the volume of the container 12, and the upper face 14 is located at approximately 50% of the height of the side walls 26 of the container 12. Also, the rear face 18 abuts the rear end wall 28 of the container 12, the side faces 20 abut the side walls 26 of the container 12, the lower face (not shown) abuts the base of the container 12 and the front face 16 abuts a bulkhead assembly 30.

The container 12 comprises doors 32 which are arranged to allow access to the internal volume of the container 12. A bulkhead assembly 30 extends across the entire width of the lower portion of the doorway of the doors 32. The bulkhead assembly 30 is connected to container 12 such that the assembly 30 is arranged to prevent the front face 16 and the fluid contents of the flexible tank 10 from impacting the doors 32. The structural rigidity and strength of the bulkhead assembly 30 is derived from the vertical 34 and horizontal 36 support members, which extend across the height and width of the bulkhead assembly 30 respectively.

The front face 16 comprises a two-way valve 38 and two one-way inlet valves 40. The three valves 38, 40 are evenly distributed and aligned horizontally at approximately the same height across the front face 16, where the two-way valve 38 is located centrally and is flanked by the two inlet valves 40. The flexible tank 10 also comprises an additional one-way outlet valve 42 located on its upper face 14. The outlet valve 42 is positioned on the upper face 14 such that it is closer to the front face 16 than to the rear face 18 and is positioned equidistantly between the side faces 20. This positioning results in the outlet valve 42 being above the level of any liquid being held within the flexible tank 10.

The two-way valve 38 is arranged for the loading and unloading of fluid into the volume of the flexible tank 10. The two inlet valves 40 are arranged to ingress fluid into the flexible tank 10 in the manner specified below.

Figure 2:
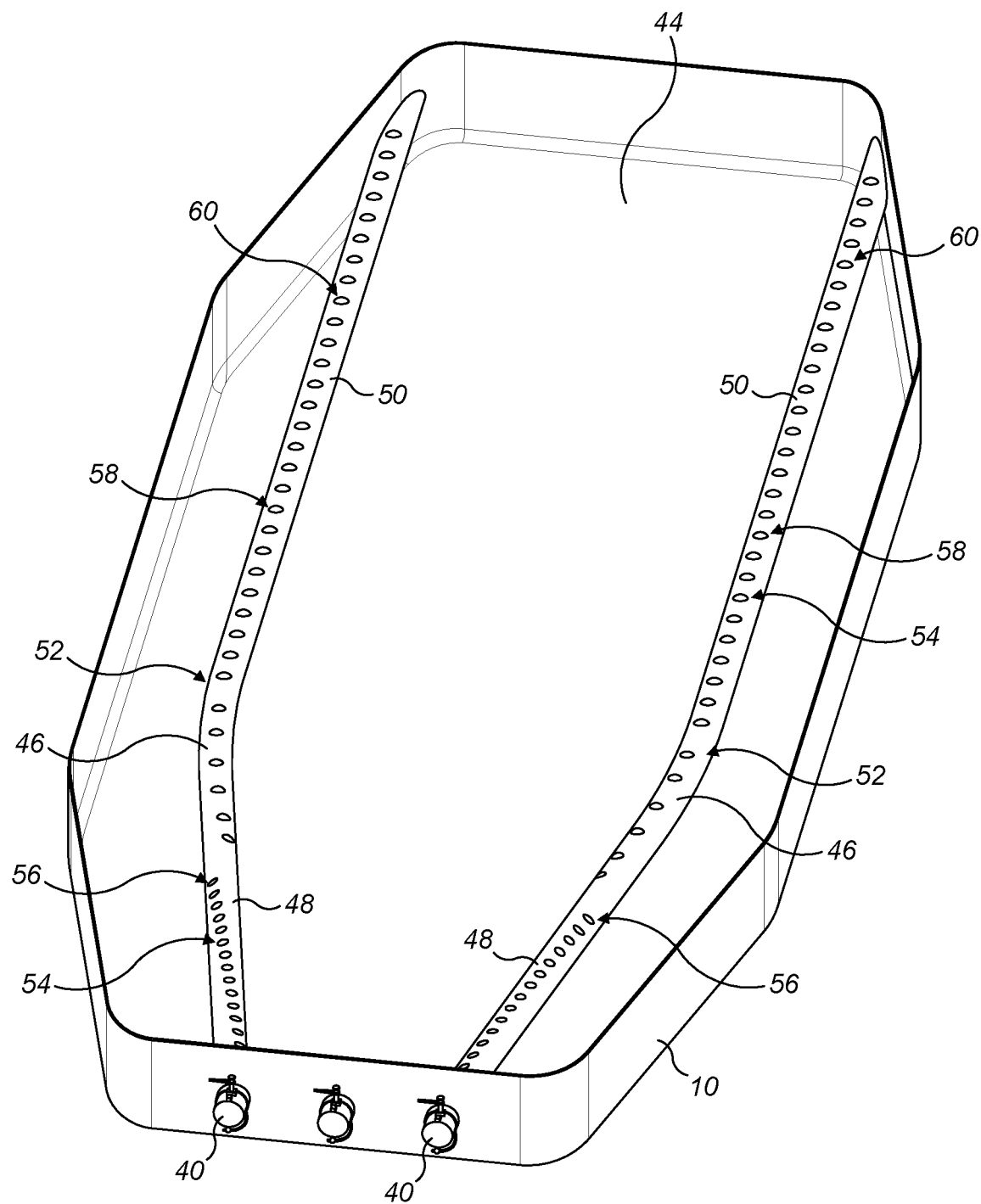
FIG. 2 shows an isometric cut-away view of a first example embodiment of a flexible tank in accordance with the present claimed invention.

Referring to FIG. 2, an isometric cut-away view of a first example embodiment of a flexible tank 10 in accordance with the present claimed invention is depicted. The cut-away view is taken in a plane parallel to the longitudinal axis of the tank 10 to show the interior surface 44 of the lower face of the flexible tank 10, such that the majority of the interior surface 44 of the lower face is shown.

The flexible tank 10 comprises one-way inlet valves 40 that are arranged to ingress a mixing fluid via a specific pathway into the flexible tank 10, such that the mixing fluid mixes and agitates the fluid contained by the flexible tank 10 in the tank volume. Each one-way inlet valve 40 is fluidly connected to an individual mixing member 46, such that mixing fluid pumped into the flexible tank 10 through the one-way inlet valves 40 enters the fluid pathway 60 enclosed by its corresponding mixing member 46. Here, two mixing members 46 are used, each mixing member 46 attached to one of the inlet valves 40. Embodiments of are envisaged where each inlet valve 40 is attached to a plurality of mixing members 46.

Each mixing member 46 extends from its corresponding inlet valve 40 on the front face 16 across the interior surface 44 of the lower face to the rear face 18. As such, each mixing member 46 extends across the largest interior surface of the flexible tank 10.

Each mixing member 46 comprises two substantially straight linear portions: an angled portion 48 and a parallel portion 50. These portions linked by a bend 52. The angled portion 48 of each mixing member 46 extends from the front face 16 at an angle offset from the normal of the front face 16 and offset at an angle from the longitudinal axis of the flexible tank 10. The angle of offset is such that the angled portions 48 of the two mixing members 46 extend away from one another towards the side walls 20, as they extend across the interior surface 44 of the lower face and into the flexible tank 10. Each angled portion 48 extends linearly across approximately one-third of the interior surface 44 of the interior surface. The angled portion 48 lies in a plane substantially parallel to one of the front chamfered faces 22.

The angled portion 48 terminates with a bend, or angle, 52 in the mixing member 46. The bend 52 angles the mixing member 46 such that the next portion of the mixing member 46, the parallel portion 50, extends in a direction substantially parallel to the normal of the front face 16 and substantially parallel to the longitudinal axis of the tank 10. That is, the angle of the bend 52 counteracts the angle of offset of the angled portion 48. The parallel portion 50 of the mixing member 46 extends from the bend 52 along for approximately two-thirds of the longest axis of the interior surface 44 of the lower face towards the rear face 16.

The mixing member 46 is attached by a weld along the entirety of its length to the interior surface 44 of the lower face. Additionally, the end of each mixing member 46 which opposes the connection to their respective inlet valve 40 is attached to the interior surface of the rear face 18 by a weld.

Each mixing member 46 is a substantially tubular pipe, where the cross section shape of each mixing member 46 is substantially circular. The width of the cross section of the mixing member 46 is substantially similar to the width of its corresponding one-way inlet valve 40.

Each mixing members 46 comprises a plurality of apertures 54. The plurality of apertures 54 are arranged to enable mixing fluid that has been pumped into the fluid pathway 60 of the mixing members 46 to leave the fluid pathway 60 at predetermined points and enter the main body of fluid contained by the flexible tank 10 in the tank volume. The apertures 54 are distributed along the entire length of the mixing members 46 such that mixing fluid can enter the tank volume of the flexible tank 10 along the entire length of the mixing members 46.

The plurality of apertures 54 comprises two subsets of apertures: angled portion apertures 56 and parallel portion apertures 58.

The angled portion apertures 56 are located on the angled portion 48 and are arranged to form a spiral pattern around the perimeter of the angled portion 48. The apertures of the angled portion apertures 56 closest to the inlet valve 40 are angled substantially inwardly and towards the other mixing member 46 and the side face 20 furthest away. The apertures of the angled portion 56 form a spiral pattern such that each subsequent aperture along the angled portion 56 spirals along the perimeter of the mixing member 46 to be angled away from the other mixing member 46 and the furthest side face 20, and angled towards the closest side face 20.

The parallel portion apertures 58 are located predominantly on the parallel portion 50 of the mixing member 46. The parallel portion apertures 58 are predominantly aligned in a straight line which is located on the uppermost surface of the mixing member 46, such that the apertures 58 are directed towards the upper face 14. The parallel portion apertures 58 are distal from the connection of the mixing member 46 to the interior surface 44.

Both the parallel portion apertures 58 and the angled portion apertures 56 are substantially circular and have a diameter smaller than the diameter of the mixing member 46. The parallel portion apertures 58 have a larger opening than the angled portion apertures 56.

The flexible tank 10 and its faces are fabricated from single-ply polyethylene (polyethene) sheets. The flexible tank may be made from one or more polyethylene sheets which are permanently attached to each by one or another by fluid-tight welds. In alternative embodiments, the flexible tank 10 is fabricated from multi-ply polymer sheets and is enclosed by a protective outer layer.

Typically, the mixing member 46 is fabricated from the same material as the flexible tank 10. As such, the mixing members 46 and the flexible tank 10 substantially comprise polyethylene. As such, the substantial majority of the mixing members 46 are flexible. The mixing members 46 are highly flexible and can be easily folded back on itself. The mixing member 46 is attached to the lower face by a polymer weld. The weld substantially comprises the same polymer as the flexible tank 10 and the mixing member 46. It is envisaged that other polymers, materials and combination thereof can be used to provide the flexible tank, mixing member and weld.

Figure 3:
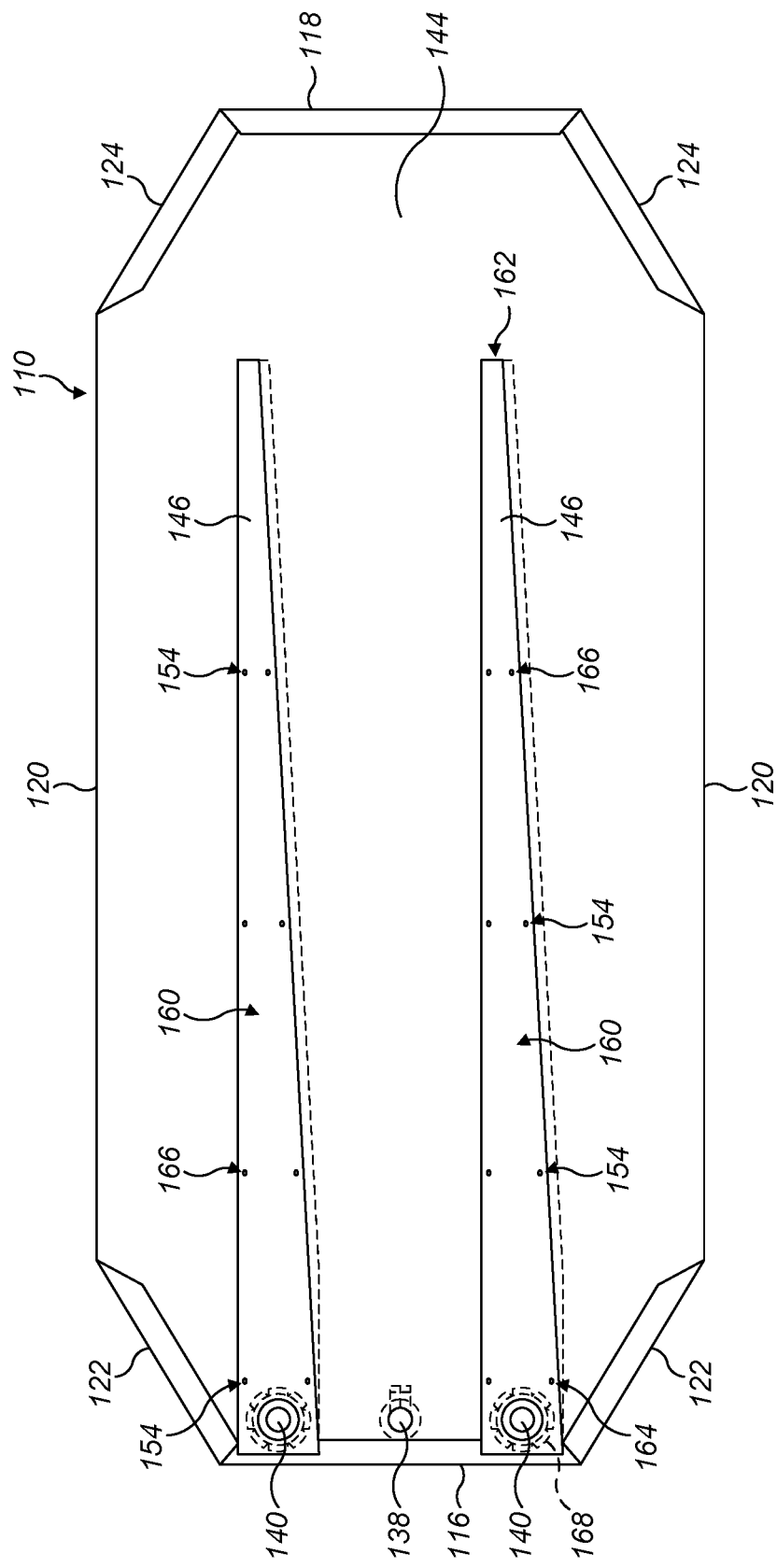
FIG. 3 shows a top-down cut-away away of a second example embodiment of a flexible tank in accordance with the present claimed invention.

Referring now to FIG. 3, a second embodiment of a flexible tank 110 in accordance with the present claimed invention is depicted. This second embodiment of the invention comprises an upper face, a lower face, a front face 116, a rear face 118, two side faces 120, front chamfered faces 122, rear chamfered faces 124, a two-way valve 138, two inlet valves 140, an outlet valve, an interior surface of the lower face 144 and a fluid pathway 160 broadly equivalent to those of the first embodiment of the invention. The second embodiment is also dimensioned to be accommodated within transportation containers in a similar manner to the first embodiment. Additionally, the second embodiment of this flexible tank is fabricated using the same techniques and materials as detailed for the first embodiment.

The mixing member 46 of the first embodiment and the mixing member 146 of the second embodiment are broadly similar in purpose. The main difference between the mixing member 46 of the first embodiment and mixing member 146 of the second embodiment is the shape and design of the mixing member 146.

Accordingly, the flexible tank 110 comprises two mixing members 146 both of which extend from their corresponding inlet valves 140 on the front face 116 across the interior surface 144 of the lower face towards the rear face 118. In this embodiment, the mixing member 146 extends approximately 80% of the distance between the front face 116 and the rear face 118. As such, each mixing member 146 extends across the largest interior surface of the flexible tank 110. The longitudinal axis of the mixing member 146 lies in a plane substantially parallel to the longitudinal axis of the flexible tank 110.

Figure 4:
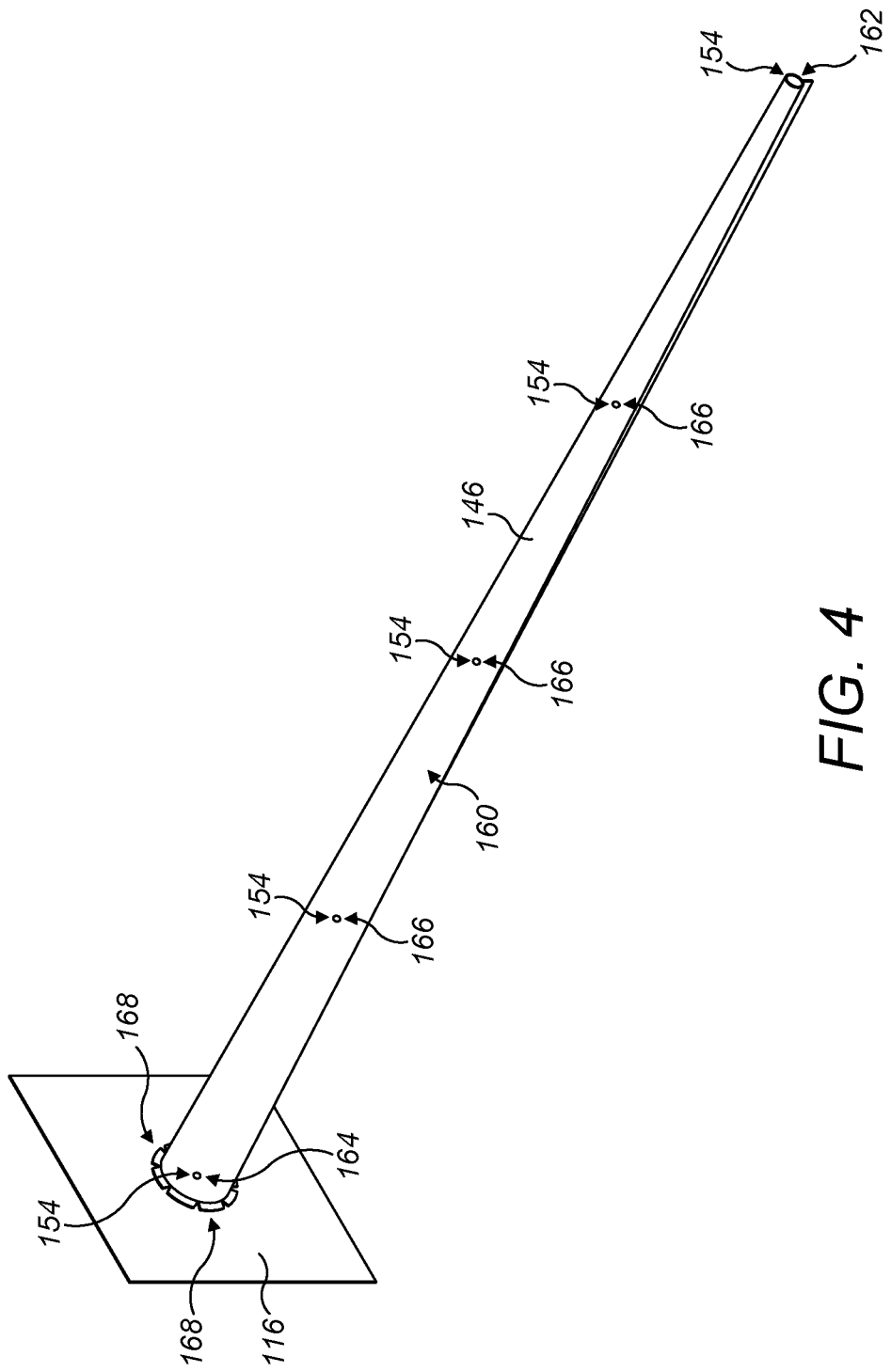
FIG. 4 shows an isometric view of a mixing member of a second embodiment of a flexible tank in accordance with the present claimed invention.

FIG. 4 depicts the mixing member 146 of the second embodiment. In this embodiment, the mixing member 146 is a tubular pipe which is frustoconically shaped and defines a fluid pathway 160 which is also frustoconically shaped. The mixing member 146 has a substantially circular cross section along its entire length, and the diameter of the mixing member 146 decreases linearly along its longitudinal axis. The base of the frustoconically shaped mixing member 146, that is the portion with the largest diameter, is attached proximate an inlet valve 140 to provide a fluid pathway 160 from the exterior of the flexible tank 110 to the tank volume.

Along the length of the mixing member 146 are provided a plurality of apertures 154, which are broadly similar to the plurality of apertures 154 of the first embodiment, as the plurality of apertures 154 are arranged to enable mixing fluid that has been pumped into the fluid pathway 160 of the mixing members 146 to leave the fluid pathway 160 at predetermined points and enter the main body of fluid contained by the flexible tank 110 in the tank volume. The apertures 154 are distributed along the entire length of the mixing members 146 such that mixing fluid can enter the tank volume of the flexible tank 110 along the entire length of the mixing members 146.

Unlike the first embodiment, the second embodiment of the plurality of apertures 146 comprises an end aperture 162. The end aperture is located on the planar truncated surface of the frustoconically shaped mixing member 146. The plurality of apertures 146, including the end aperture 162, are distributed substantially evenly along the length of the mixing member 146. The apertures of the plurality of apertures have substantially circular cross sections.

The apertures 164 of the plurality of apertures 154 proximate and closest to the inlet valve 140 are smaller than the rest of the apertures of the plurality of apertures 154, whilst the end aperture 162, which is the aperture furthest from the inlet value 140, is the largest aperture of the plurality of apertures 154. The remaining middle apertures 166 of the plurality of aperture 154 are all identically sized and smaller than the end aperture 162 and larger than the inlet valve proximate aperture 164. The middle apertures have a diameter of approximately double the diameter of the inlet valve proximate aperture 164, and approximately one-fifth the diameter of the end aperture 162. The apertures in the plurality of apertures 154 are substantially aligned in a straight line.

The mixing member 146 is fabricated from a single sheet of appropriate polymeric material that had been rolled in a cone and secured in place by a bar weld. The rolling of the mixing member 146 is performed such that a tab of the single sheet is left attached along the length of the frusto-conical mixing member 146. This tab of material is welded to the interior surface of the lower surface 144 of the flexible tank 110 by an extrusion weld to secure the mixing member 146 inside the tank. The weld is performed along substantially the entire length of the mixing member 146. The mixing member 146 is also secured to the interior surface of the front surface 116 by a weld 168. The weld 168 and attachment of the mixing member 146 to the front surface 116 is arranged such that any fluid that enters the flexible tank 110 through an inlet valve 140 enters the fluid pathway 160 defined by a mixing member 146 before it can enter the main volume of the flexible tank 110. The weld 168 is formed by splaying the end of mixing member 146 into tabs which can then extrusion welded to the interior surface of the front face 116. As such, the weld 168 comprises several sub-welds.

The invention claimed is:

1. A flexible tank for transporting fluids in a transportation container, the flexible tank defining a tank volume for containing a fluid and comprising:
   a mixing member enclosing a fluid pathway extending across an interior surface of the flexible tank, and
   an inlet valve configured to allow passage of fluid from outside the flexible tank into the fluid pathway,
   wherein the mixing member is conically or frustoconically shaped and reduces in cross sectional area along a longitudinal axis in a direction away from the inlet valve and includes an aperture such that the inlet valve is in fluid communication with the tank volume via the fluid pathway, and
   wherein the mixing member comprises a plurality of apertures wherein the plurality of apertures include:
      a proximate aperture, wherein the proximate aperture is a closest aperture of the plurality of apertures to the inlet valve;
      an end aperture, wherein the end aperture is a farthest aperture of the plurality of apertures from the inlet valve; and
      a plurality of middle apertures, wherein the plurality of middle apertures are larger than the proximate aperture and smaller than the end aperture.

2. The flexible tank of claim 1, wherein the mixing member extends across at least 50% of the interior surface of the flexible tank.

3. The flexible tank of claim 1, wherein the mixing member extends across at least 75% the interior surface of the flexible tank.

4. The flexible tank of claim 1, wherein the flexible tank further comprises at least one outlet valve configured to allow passage of fluid out of the tank volume.

5. The flexible tank of claim 4 wherein, in use, the outlet valve is located in an upper surface of the flexible tank.

6. The flexible tank of claim 1, wherein, in use, the mixing member extends across a lower surface of the flexible tank.

7. The flexible tank of claim 1, wherein the mixing member extends across a largest interior surface of the flexible tank.

8. The flexible tank of claim 1, wherein the mixing member is attached along substantially an entire length of the mixing member to the interior surface of the flexible tank.

9. The flexible tank of claim 1, wherein a cross sectional area of the aperture is smaller than a cross sectional area of the fluid pathway.

10. The flexible tank of claim 1, wherein a longitudinal axis of the mixing member is substantially parallel to a longitudinal axis of the flexible tank, wherein the longitudinal axis of the mixing member is a longest axis of the mixing member and a horizontal axis of the mixing member, and the longitudinal axis of the flexible tank is a longest axis of the flexible tank and a horizontal axis of the flexible tank.

11. The flexible tank of claim 1, wherein the plurality of apertures is configured to allow fluid to egress from the fluid pathway through each of the apertures of the plurality of apertures into the tank volume simultaneously.

12. The flexible tank of claim 11, wherein at least a portion of the plurality of apertures are located on a surface of the mixing member which is distal from the interior surface of the flexible tank which the mixing member extends across.

13. The flexible tank of claim 11, wherein the plurality of apertures comprises at least one portion of aligned apertures.

14. The flexible tank of claim 11, wherein the apertures of the plurality of apertures are substantially evenly distributed along a length of the at least one mixing member.

15. The flexible tank of claim 1, wherein the flexible tank comprises a plurality of mixing members.

16. The flexible tank of claim 15, wherein the flexible tank comprises a plurality of inlet valves, and each one of the plurality of inlet valves is connected to a different mixing member within the plurality of mixing members.

17. The flexible tank of claim 1, wherein the proximate aperture is a smallest aperture of the plurality of apertures and the end aperture is a largest aperture of the plurality of apertures.

18. An intermodal container, the intermodal container containing a flexible tank according to claim 1.

19. A method of mixing fluid contents of a flexible tank, the method comprising the steps of:
   providing a flexible tank according to claim 1, the flexible tank containing at least one fluid within the tank volume;
   providing a mixing fluid;
   pumping the mixing fluid into the mixing member via the inlet valve such that the mixing fluid flows though the fluid pathway and through the aperture into the tank volume to mix the at least one fluid within the tank volume.

* * * * *